US009417419B2

(12) United States Patent
Takeuchi et al.

(10) Patent No.: US 9,417,419 B2
(45) Date of Patent: Aug. 16, 2016

(54) METHOD, SYSTEM, AND APPARATUS FOR INSTALLATION OF OPTICAL FIBER CABLE

(71) Applicants: Kenichiro Takeuchi, North Brunswick, NJ (US); Haiguang Lu, Los Altos, CA (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 577 days.

(21) Appl. No.: 13/684,972

(22) Filed: Nov. 26, 2012

(65) Prior Publication Data

US 2013/0294734 A1 Nov. 7, 2013

Related U.S. Application Data

(60) Provisional application No. 61/642,107, filed on May 3, 2012.

(51) Int. Cl.
*G02B 6/44* (2006.01)
*G02B 6/46* (2006.01)

(52) U.S. Cl.
CPC ............ *G02B 6/4471* (2013.01); *G02B 6/4401* (2013.01); *G02B 6/4466* (2013.01); *G02B 6/4478* (2013.01); *G02B 6/46* (2013.01); *G02B 6/4459* (2013.01); *Y10T 29/49826* (2015.01); *Y10T 29/53961* (2015.01); *Y10T 156/10* (2015.01)

(58) Field of Classification Search
CPC .... G02B 6/3628; G02B 6/3616; G02B 6/508; G02B 6/3636
See application file for complete search history.

(56) References Cited

U.S. PATENT DOCUMENTS

| | | | | |
|---|---|---|---|---|
| 5,100,221 A | * | 3/1992 | Carney et al. | 385/135 |
| 2003/0021633 A1 | * | 1/2003 | Seto | G02B 6/502 |
| | | | | 405/174 |
| 2007/0077125 A1 | * | 4/2007 | Kadrnoska | F16L 3/223 |
| | | | | 405/183.5 |
| 2009/0054727 A1 | * | 2/2009 | Yamaya | 600/107 |

FOREIGN PATENT DOCUMENTS

| | | |
|---|---|---|
| CN | 201897654 U | 7/2011 |
| WO | 2012012357 A1 | 1/2012 |

OTHER PUBLICATIONS

International Search Report and Written Opinion for Application No. PCT/US2013/039259 dated Oct. 18, 2013.
Partial Search Report for Application No. PCT/US2012/039259 dated Aug. 7, 2013.
Chinese Office Action for Application No. 201310036293.4 dated Oct. 10, 2015.

* cited by examiner

*Primary Examiner* — Michelle R Connelly
*Assistant Examiner* — Hoang Tran
(74) *Attorney, Agent, or Firm* — Lerner, David, Littenberg, Krumholz & Mentlik, LLP

(57) ABSTRACT

Methods, systems, and apparatuses that facilitate installation of a communications cable, e.g., an optical fiber cable, are disclosed. The system may include a communications cable and an adhesive for securing the cable to a surface. The method may include the use of an adhesive to secure the communications cable to a surface. The apparatus may include a pathway to avoid over-bending of the communications cable, which may otherwise result in transmission loss and compromise the performance of the cable.

3 Claims, 11 Drawing Sheets

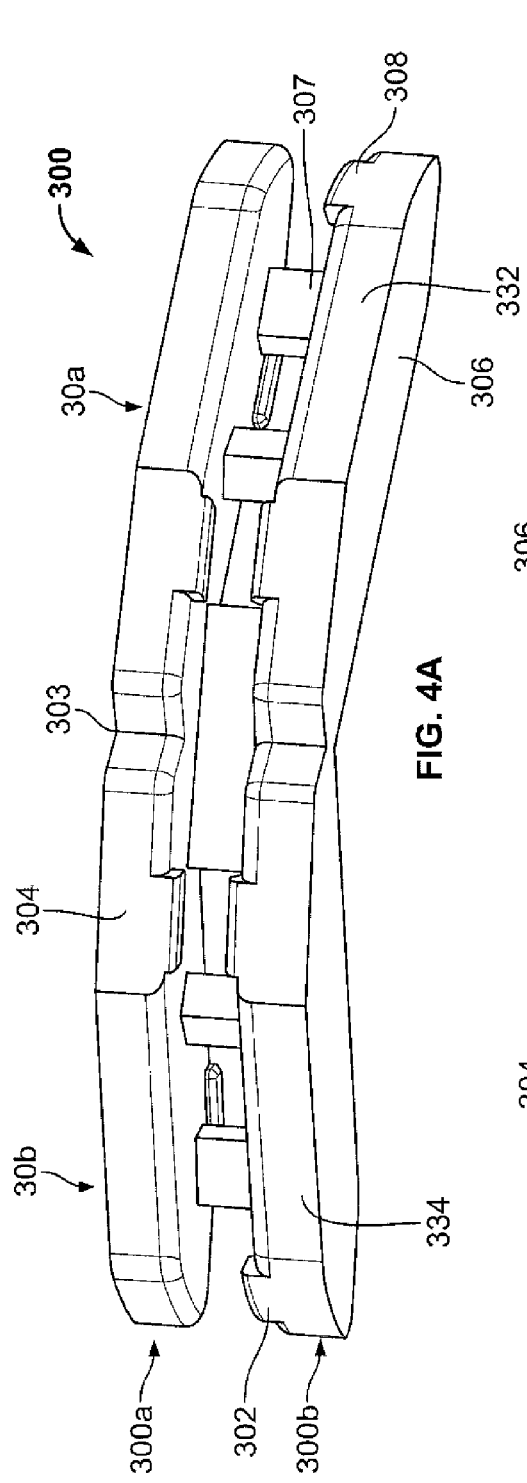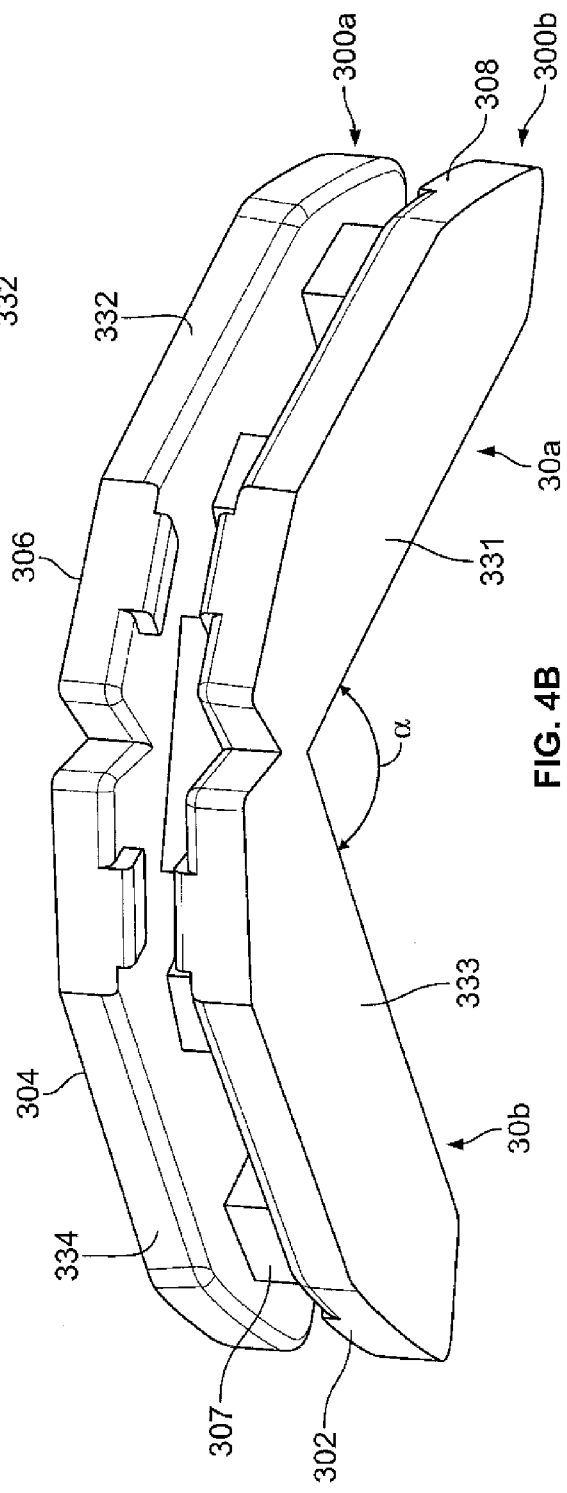

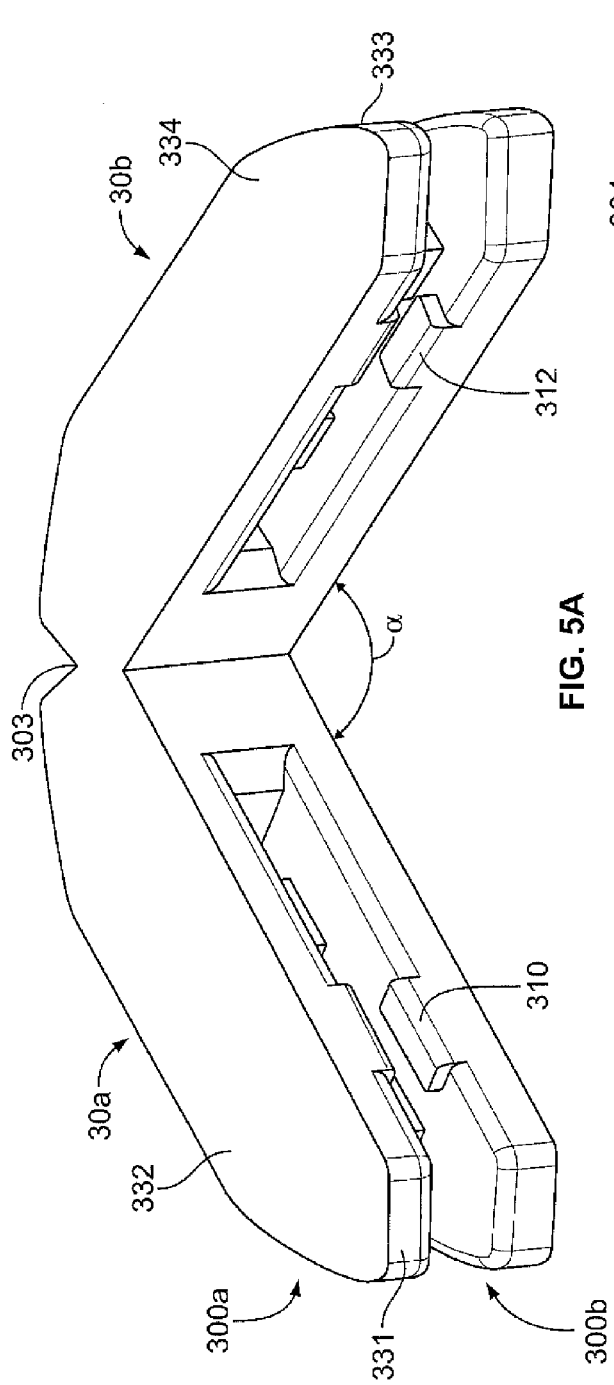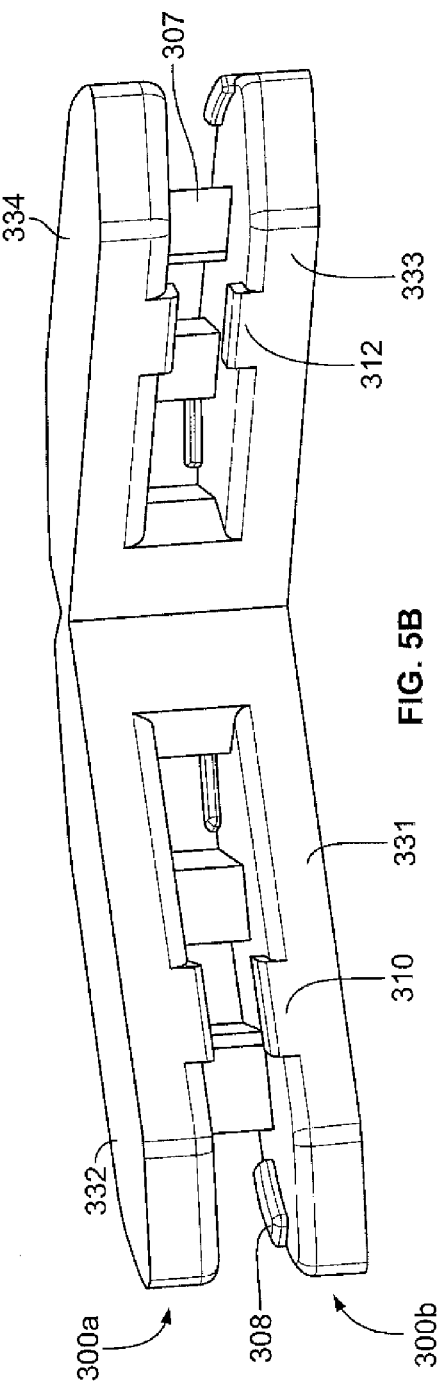
FIG. 5A
FIG. 5B

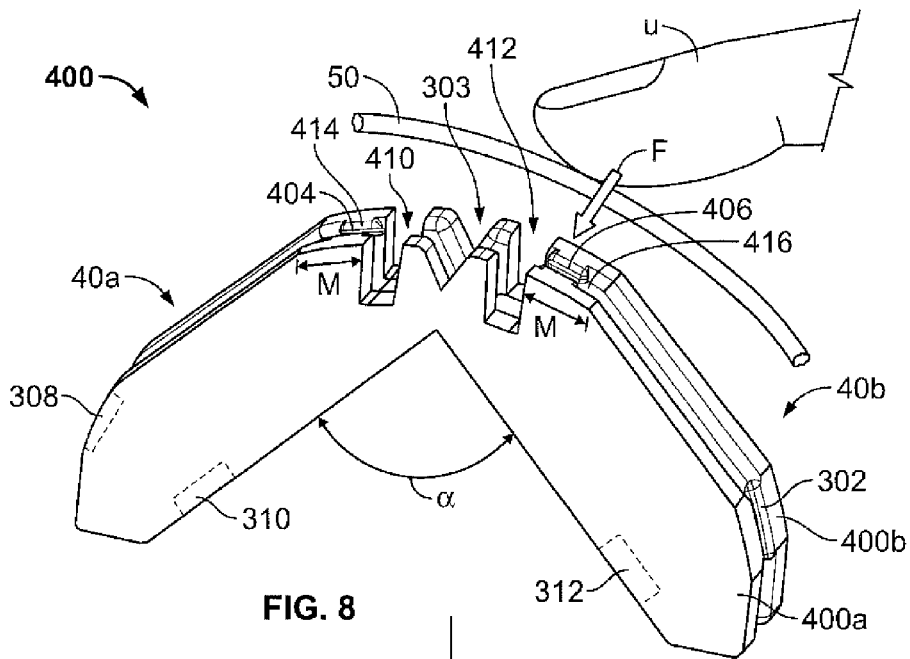
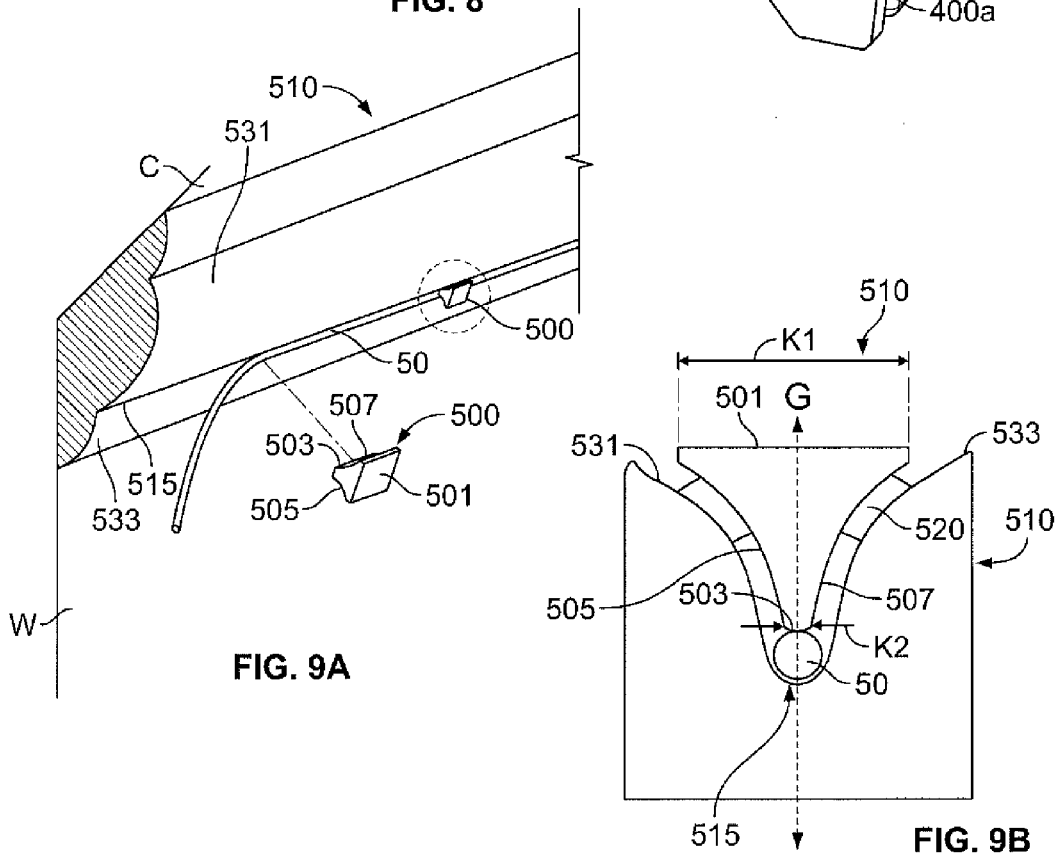

METHOD, SYSTEM, AND APPARATUS FOR INSTALLATION OF OPTICAL FIBER CABLE

CROSS-REFERENCE TO RELATED APPLICATIONS

The present application claims the benefit of the filing date of U.S. Provisional Patent Application No. 61/642,107, filed May 3, 2012, the disclosure of which is hereby incorporated herein by reference.

BACKGROUND OF THE INVENTION

The present disclosure generally relates to methods and apparatus that facilitate the installation of a communications cable. More particularly, the present disclosure relates to methods and apparatus that facilitate the installation of an optical fiber cable.

Improper installation of a communications cable may result in attenuation of a signal being conveyed in the cable, which is commonly known as "signal loss". With respect to optical fiber cables, the signal loss may result from the incomplete transmission of an optical signal through the optical fiber cable. There are different reasons for losses that may occur during the transmission of optical signals through an optical fiber cable.

For example, when an optical fiber cable is bent, the propagation conditions in the optical fiber cable may become altered such that light rays that would propagate in a straight optical fiber are lost in the cladding of the optical fiber. In general, bending loss may be the result of macrobending or microbending. Macrobending is the bending of the cable in a tight radius. Microbending refers to bending a small portion of the cable. Microbending may be caused by pinching or squeezing the cable and can result from mishandling or improper installation of the cable.

Different optical fiber cables have different specifications regarding the degree to which the cable can be bent without affecting performance of the cable or resulting in signal loss. When the bend curvature defines an angle that is too sharp for the optical signal to be reflected back into the core of the particular optical fiber, some of the optical signal may escape through the fiber cladding causing optical signal loss.

Cable performance and the reduction of signal loss may be facilitated through proper cable handing and installation. Thus, a continuing need exists for improved apparatuses and methods that facilitate installation of communications cables.

BRIEF SUMMARY OF THE INVENTION

Methods, systems, and apparatuses for facilitating the installation of a communications cable, e.g., a fiber optic cable, are disclosed.

A communications cable system may include an adhesive that is configured to be applicable to a surface, and a communications cable that is operatively coupled to the adhesive. The adhesive is configured to secure the cable to the surface, and is transitionable amongst a first, second, and third state. The first state is substantially uncured. The second state is partially cured. The third state is substantially cured. In the first and second states, the cable is repositionable relative to the adhesive. In the third state, the cable is fixedly secured to the adhesive.

A method for installing a communications cable may include applying an adhesive to a surface, and placing the communications cable in contact with the adhesive. The adhesive is transitionable amongst a first state, a second state, and a third state, the first state being substantially uncured, the second state being partially cured, and the third state being substantially cured. In the first state, the adhesive is substantially viscous. In the second state, the cable is releasably securable to the adhesive. In the third state, the cable is fixedly secured to the adhesive.

An apparatus for facilitating installation of a communications cable may include a housing and at least one pathway defined by the housing. The pathway may be configured to releasably secure the cable therein and defines a curve. The curve defines a radius of curvature within a predetermined range of values for the cable at which transmission loss of a signal conveyed through the cable is minimized. The housing may be securable to a surface. The housing may include at least one guide structure defining the pathway with at least tab. The at least one pathway may include a first pathway and a second pathway. The housing may define first and second sections, the first section and second section defining an angle therebetween. The angle between the first and second sections may be adjustable. The housing may define first and second sections, the first and second sections separable from each other.

A method of installing a communications cable may include providing an apparatus including a housing and at least one pathway defined by the housing. The apparatus may be secured to a surface. The pathway may be configured to releasably secure the cable therein. The pathway may define a curve defining a radius of curvature within a predetermined range of values for the cable at which transmission loss of a signal conveyed through the cable is minimized. The cable may be placed within the pathway. The housing may include a first section and a second section, the first and second sections separable from each other, and further comprising separating the first and second sections. The housing may include a first section and a second section, and the surface defines a first portion and a second portion that are angled relative to each other, the first and second sections defining an adjustable angle therebetween. The adjustable angle between the first and second sections may be adjusted to facilitate placement of the first section on the first portion and the second section on the section portion.

An apparatus for facilitating installation of a communications cable may include a wedge-shaped or triangular prism shaped member including a first side and a second side. The first and second sides taper toward each other such that the width of the apparatus tapers or narrows along its height. The apparatus is configured to secure a cable within a groove defined by adjacent, angled surfaces such as within a groove defined by surfaces of a molding. The first and second sides may have a shape or configuration that corresponds to that of the surfaces. An adhesive may be used to secure the apparatus to the surface. A method of installing a cable using the apparatus may include positioning the cable within the groove, and then securing the apparatus to the surfaces defining the groove by adhesive while the cable is positioned within the groove such that the cable is secured within the groove by the apparatus.

An apparatus for facilitating installation of a communications cable may include a backing and an arm member. The backing is securable to a surface, and the arm member is bendable or pivotable relative to the backing. The arm member may be generally S-shaped, and may be biased in a first direction toward the backing such that when a cable is placed between the arm member and the surface, the arm member secures the cable against the surface and minimizes separation of the cable from the surface. In addition, the apparatus is adapted so that, when the backing is secured to a surface, a cable is positionable between the surface and the arm member. The arm member facilitates securing the cable in a desired position along or relative to a surface.

These and other features of the present disclosure will be more fully described with reference to the accompanying figures.

BRIEF DESCRIPTION OF THE DRAWINGS

By way of description only, embodiments of the present disclosure will be described herein with reference to the accompanying drawings, in which:

FIG. 4A is a front perspective view of yet another embodiment of an installation apparatus;

FIG. 4B is another front perspective view of the installation apparatus of FIG. 4A;

FIG. 5A is a back perspective view of the installation apparatus of FIG. 4A;

FIG. 5B is another back perspective view of the installation apparatus of FIG. 4A;

FIG. 8 is a perspective view of a still further embodiment of an installation apparatus;

FIG. 9A is a perspective view of another embodiment of an installation apparatus shown in use;

FIG. 9B is a cross-sectional view of the indicated area of detail of FIG. 9A;

DETAILED DESCRIPTION

Figure 1:
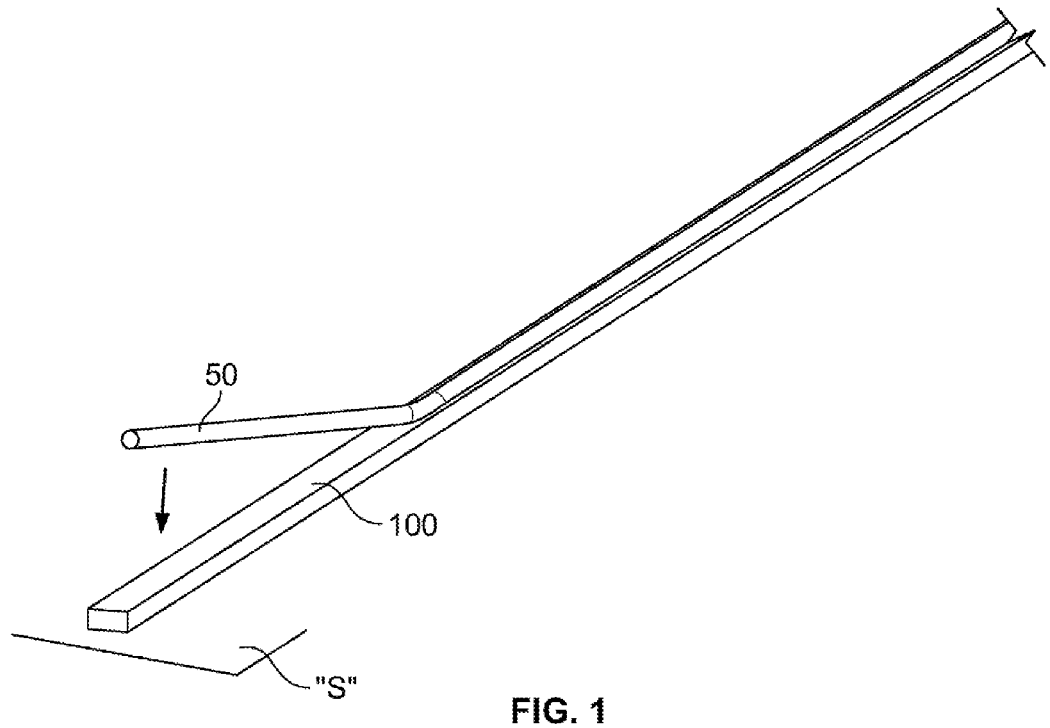
FIG. 1 is a perspective view of a communications cable shown relative to an adhesive layer that is placed on a surface.

Particular embodiments of the present disclosure will be described with reference to the accompanying drawings. In the figures and in the description that follow, in which like reference numerals identify similar or identical elements.

A communications cable 50 (FIG. 1) includes but is not limited to an optical fiber cable through which an optical signal is transmitted. The communications cable 50 may have a specified range of radii of curvature, which refers to the degree to which the communications cable 50 may be bent without resulting in an unacceptable optical signal transmission loss. It is to be understood that other types of communications cables may be utilized without deviating from the scope and spirit of the present disclosure. Methods and apparatus for the installation of communications cables, e.g., securing a communication cable to one or more surfaces, are described below with reference to the accompanying drawings.

A method for installing the communications cable 50 will now be described with reference to FIG. 1. As shown in FIG. 1, an adhesive 100 may be applied to a surface S and the cable 50 may be placed onto the adhesive 100 to facilitate securing the cable 50 to desired locations on or along the surface S.

The adhesive 100 is transitionable amongst the following states: (a) a first state in which the adhesive 100 is uncured or substantially uncured; (b) a second state in which the adhesive 100 is partially uncured; and (c) a third state in which the adhesive 100 is fully cured or substantially cured. Exposure to the ambient environment, e.g., air, for a duration or length of time, causes the adhesive to transition from the first state to the second state, and then from the second state to the third state. The adhesive 100 is configured to remain in the second state for a duration of time, e.g., 30 minutes. While in the second state, the flow of the adhesive 100 is substantially inhibited. In addition, while in the second state, the adhesive 100 is substantially sticky or adhering to facilitate releasably adhering the cable 50 to the adhesive 100.

In the first state, the adhesive 100 is substantially viscous facilitating the adherence of the adhesive 100 to desired locations on the surface S. In the second state, the adhesive 100 is sufficiently cured to facilitate holding of the cable 50 to the adhesive 100 for a greater length of time than possible when the adhesive 100 is in the first state. In the second state, when the cable 50 is placed in contact with the adhesive 100, the adhesive 100 releasably secures the cable 50 at the areas of the surface S opposite the portions of the adhesive 100 that the cable 50 is contacting. Once the cable 50 is positioned contacting the adhesive at a desired position and then left at such desired position, the cable is permanently secured at the portions of the surface S opposite the locations the cable contacts the adhesive, when the adhesive 100 has transitioned to the third state.

Figure 2A:
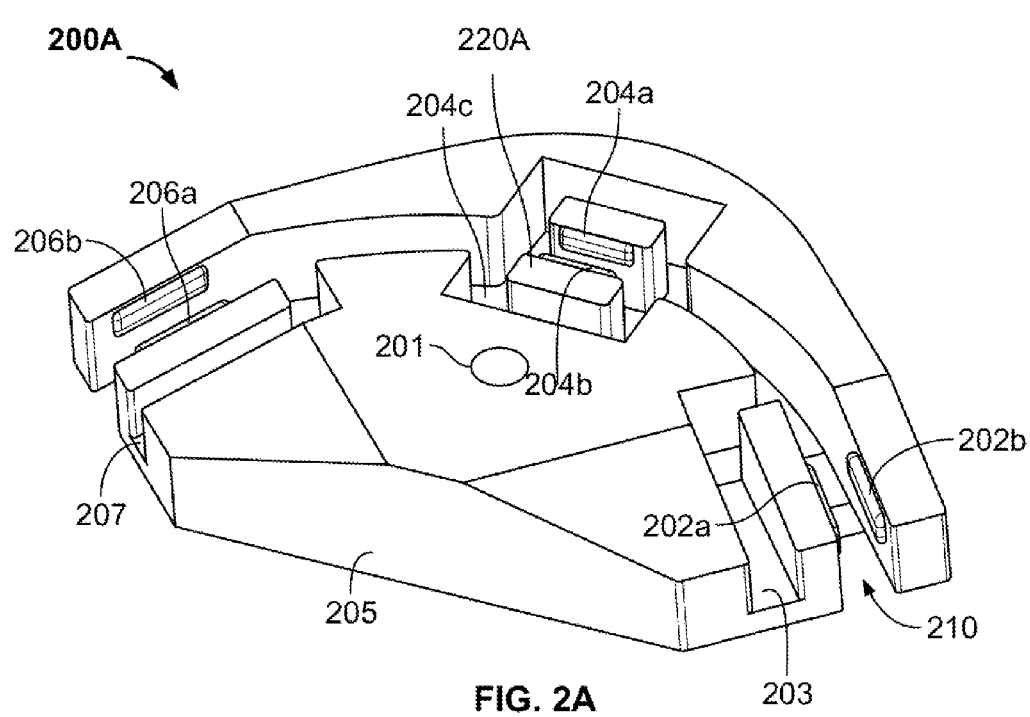
FIG. 2A is a perspective view of an embodiment of an installation apparatus.
Figure 2B:
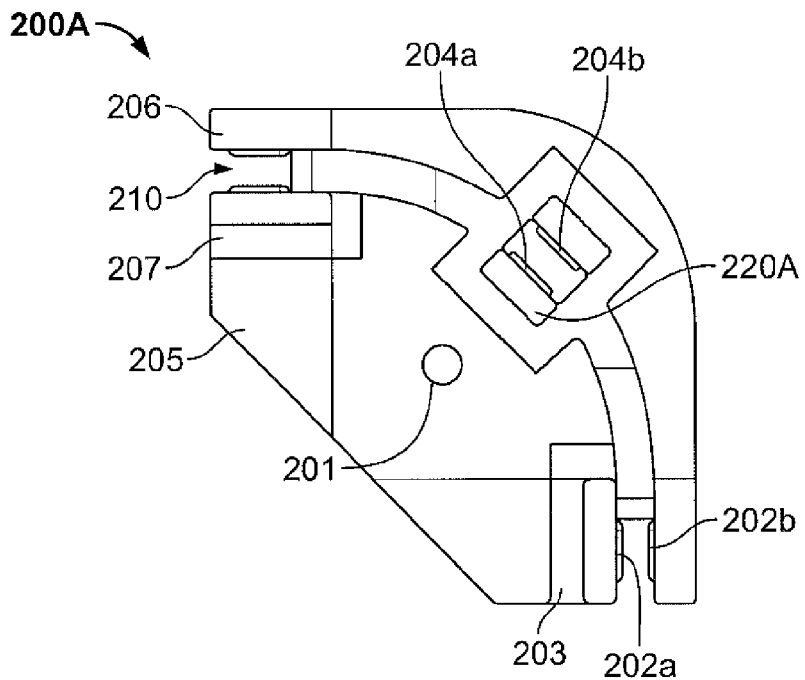
FIG. 2B is a top view of the installation apparatus of FIG. 2A.
Figure 2C:
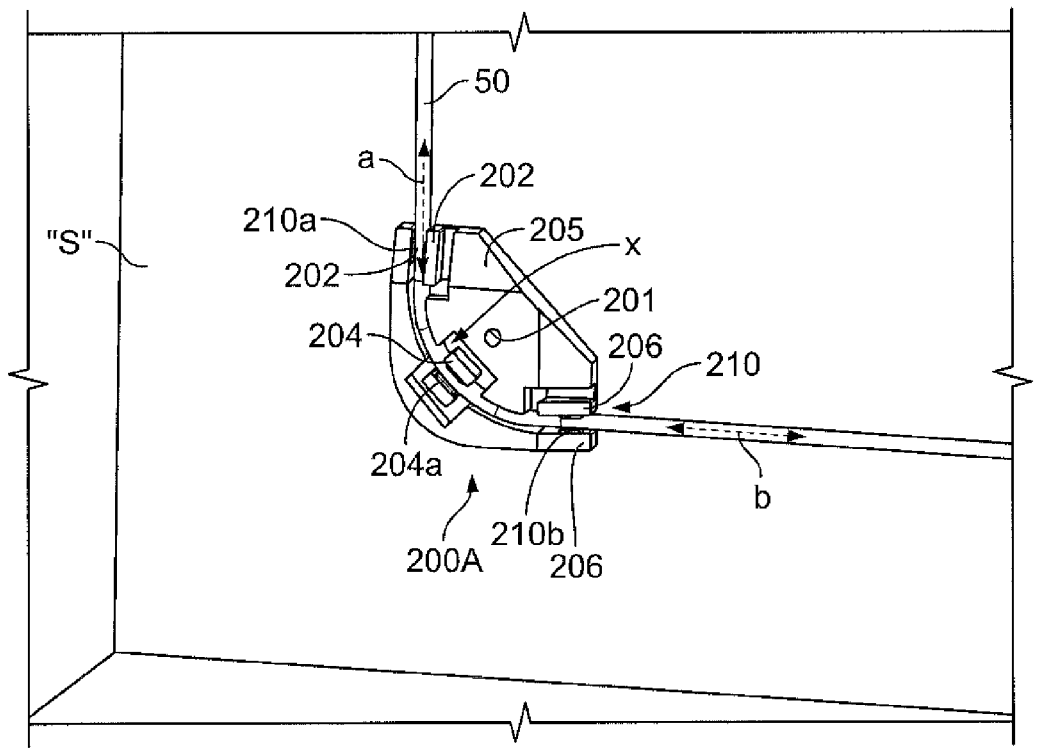
FIG. 2C is a perspective view of the installation apparatus of FIG. 2A shown in use.

An installation apparatus 200A will now be described with reference to FIGS. 2A-2C. The apparatus 200A includes a housing 205 that defines a guide path 210. In an embodiment, the apparatus 200A may be integrally formed, e.g., formed from a single block of material. The guide path 210 is configured to receive the cable 50 therethrough. The guide path 210 defines a radius of curvature that corresponds with an acceptable radius of curvature for the cable 50, thereby avoiding over bending of the cable 50. The guide path 210 provides that a radius of curvature of the cable 50 secured therein is within a predetermined range of values for the cable at which transmission loss of a signal conveyed through the cable is minimized. The apparatus 200A is securable, e.g., may be mounted or adhered, to surface S (FIG. 2C). The housing 205 may include an aperture 201 through which a fixation member (not shown), e.g., a screw or nail, may be placed to facilitate securing of the apparatus 200A to the surface S. One or more pairs of spaced tabs 202a and 202b, 204a and 204b, and 206a and 206b, which define portions of the guide path 210, avoid unintentional separation of the cable 50 from within the guide path 210. Each pair of tabs 202a and 202b, 204a and 204b, 206a and 206b may be made of a material, such as plastic, that provides the tabs can be bent or deflected, such as by hand or pressing the cable 50 between a pair of the tabs, to facilitate the removable securing of the cable 50 within the guide path 210. A groove 207 may be formed in the housing 205 to separate the innermost tab 206a from the housing 205, thereby facilitating flexing or bending of the tab 206a with respect to the housing 205. Similarly, a groove 203 may be formed in the housing 205 to separate the innermost tab 202a from the housing, thereby facilitating flexing or bending of the tab 202a with respect to the housing 205. A groove 204c may formed in the housing 205 to separate both of the tabs 204a and 204b from the housing, thereby facilitating flexing or bending of the tabs 204a and 204b. The tabs 204a and 204b may have upper surfaces 220A that are coplanar or recessed with respect to a surface of the housing 205 adjacent to the groove 201. During use, as shown in FIG. 2C, the apparatus 200A is secured to a desired location with respect to the surface S. The cable 50 is guided through the guide path 210 such that the bending of the cable 50 is within an acceptable bending radius range. Thus, the direction of routing of the cable 50 may be adjusted by using the apparatus 200A without over-bending the cable at the locations where a change of the direction of routing is desired. Referring to FIG. 2C, at an entrance 210a of the guide path 210, the cable 50 may extend along a first axis a; and at an exit 210b of the guide path 210, the cable 50 may extend along a second axis b. Although axes a, b are shown as being substantially perpendicular to one another, it is to be understood that a plurality of changes in the direction of routing of the cable 50 may be provided within the apparatus 200A, such that the portion of the cable 50 exiting the apparatus extends in a different direction than the direction the portion of the cable 50 entering the apparatus extends, while still maintaining bending of the cable 50 within acceptable limits.

Figure 3A:
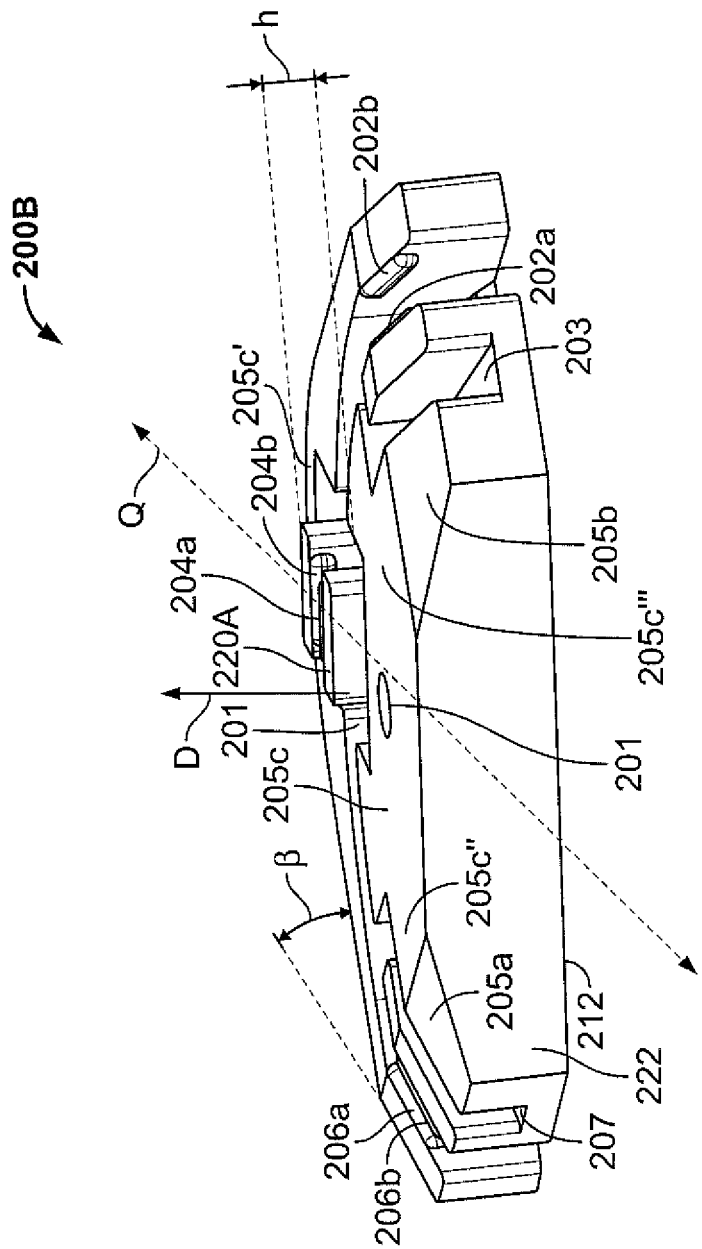
FIG. 3A is a perspective view of another embodiment of an installation apparatus.
Figure 3B:
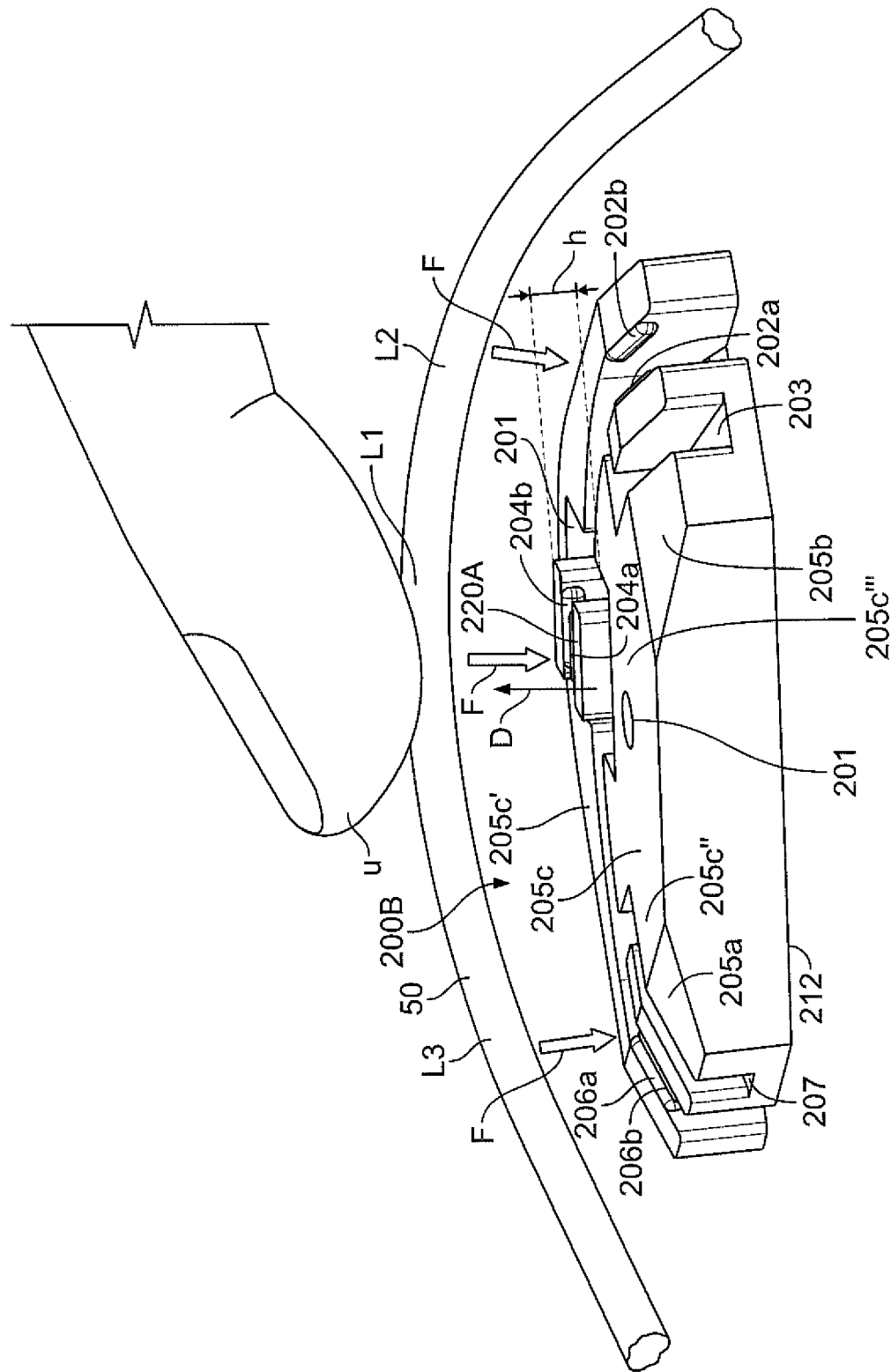
FIG. 3B is a perspective view of the installation apparatus of FIG. 3A shown relative to the communications cable of FIG. 1.

Another embodiment of an installation apparatus 200B is shown in FIGS. 3A and 3B. The installation apparatus 200B is substantially similar to the apparatus 200A and includes each of the features of the apparatus 200A except as indicated hereinbelow. The apparatus 200B includes a housing 205 that includes an upper surface 205a that is adjacent to groove 207, an upper surface 205b that is adjacent to groove 203, and an upper surface 205c that is positioned between the upper surface 205a and the upper surface 205b. The tabs 204a and 204b have upper surfaces 220A and extend in a direction D away from the upper surface 205c, such that upper surfaces 220A of the tabs 204a and 204b are spaced a distance h in the direction D from an area 205c' of the upper surface 205c that is adjacent to the tabs 204a and 204b. The apparatus 200B may be substantially symmetrical with respect to a central axis Q that extends along the upper surface 205c and is transverse relative to the tabs 204a and 204b. The upper surfaces 205a and 205b are substantially coplanar and are adjacent areas 205c" and 205c''', respectively, of the upper surface 205c. The areas 205c" and 205c''' may each be angled by angle β with respect to the upper surfaces 205a and 205b, respectively, such that the upper surface 205c is downwardly sloped, in a direction opposite to direction D, from the upper surfaces 205a and 205b toward the central axis Q, such that the upper surface 205c is most recessed with respect to the upper surfaces 205a and 205b at or near the central axis Q, and is less recessed closer to the surfaces 205a and 205b. The recessed arrangement of the upper surface 205c results in a length of the tabs 204a and 204b extending so as to be elevated by distance h in relation to the upper surface 205c separating the upper surfaces 220A of the tabs 204a and 204b from the upper surface 205c. During use, as shown in FIG. 3B, a user may press a cable 50 into the space between the tabs 204a and 204b by applying a force F with his finger U focused at a location L1 on the cable 50 corresponding to a portion of the cable to be inserted between the tabs 204a and 204b. Since the tabs 204a and 204b are spaced by distance h from the adjacent area 205c' of the upper surface 205c, the force F applied on the cable 50 is not also applied to the area 205c and is instead concentrated on a smaller length of the cable. Thus, the force F is not distributed along a length of the cable 50 that is not to be inserted between the tabs 204a and 204b, such that relatively less force may be applied to secure the cable 50 between the tabs 204a and 204b than would be the case if the upper surfaces of such tabs were coplanar or recessed with respect to the area 205c' of the upper surface 205c. Thus, the upper surfaces 205a and 205b are elevated with respect to the areas 205c" and 205c''' of the upper surface 205c, and therefore the force F applied to the cable 50 to secure the cable 50 between the spaces of the tabs 206 and 202 may be concentrated at locations L2 and L3 along the length of the cable 50, respectively, and the force F applied by the user's finger U is less distributed upon adjacent surfaces, such as the upper surface 205c, during insertion of the cable 50 in the spaces between tabs 206a and 206b and tabs 202a and 202b, respectively.

Furthermore, the length of the tabs 204a and 204b in direction D, such as height h, may be adapted such that the tabs 204a and 204b may be caused to separate from one another when a predetermined force is applied to a cable to insert the cable between the tabs 204a and 204b. In particular, the greater the length that each of the tabs 204a and 204b extends in the direction D, the less force that may be applied to the cable to cause the tabs 204a and 204b to separate from each other and receive, and hence, secure the cable therebetween.

Figure 6:
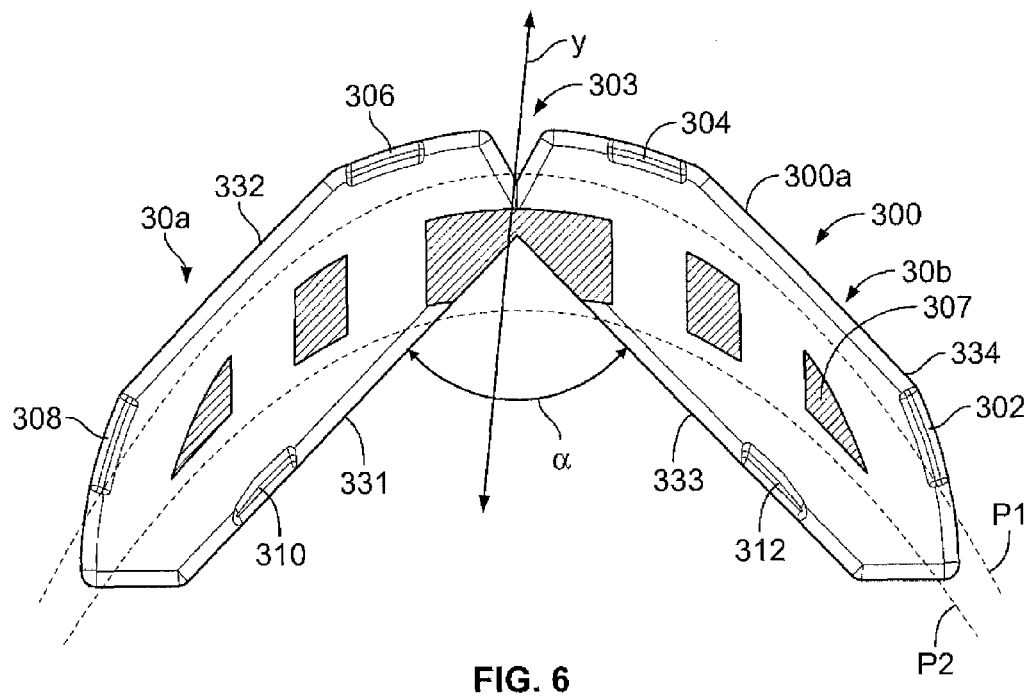
FIG. 6 is a cut-away view of a portion of the installation apparatus of FIG. 4A.

A still further embodiment of an installation apparatus will is shown in FIGS. 4A-7C. An installation apparatus 300 may include a first half 300A and a second half 300B that define upper and lower portions, respectively, of the installation apparatus 300. The first and second halves 300A, 300B are substantially identical to each other. The first half 300A is depicted in FIG. 6. As shown in FIG. 6, an installation apparatus 300 defines a first exterior guide path P1 and a second interior guide path P2. The guide paths P1 and P2 are configured to provide that the radius of curvature of the cable secured therein minimizes transmission loss in the cable, similarly as described above for the apparatus 200A. The installation apparatus 300 may include a first portion 30A and a second portion 30B, each of which is formed by the first and second halves 300A, 300B as shown in FIG. 5A, and which are substantially mirror images of each other with respect to axis y (FIG. 6). The contour of the guide paths P1, P2 may be defined by one or more guide structures 307. By using multiple spaced guide structures 307, which extend from the first half 300A toward the second half 300B or the second half 300B toward the first half 300A, or from the first half 300A to the second half 300B, the amount of material and the resultant weight of the apparatus 300 may be reduced. Furthermore, the use of multiple spaced guide structures 307 may facilitate molding of the installation apparatus 300. Tabs 308, 306, 304, 302 facilitate maintaining the cable 50 within guide path P1, i.e., between the tabs 308, 306, 304, 302 and the one or more guide structures 307. Similarly, tabs 310 and 312 facilitate maintaining the cable 50 within guide path P2, i.e., between the tabs 310, 312 and the one or more guide structures 307.

Figure 7A:
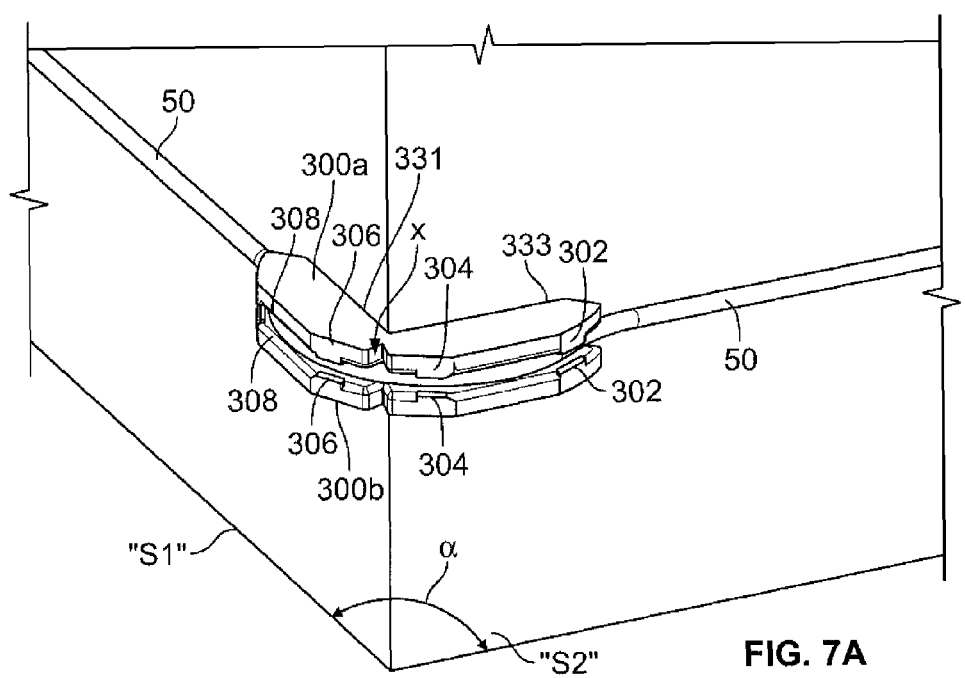
FIG. 7A is a perspective view of the installation apparatus of FIG. 4A shown in use relative to two angled surfaces.
Figure 7B:
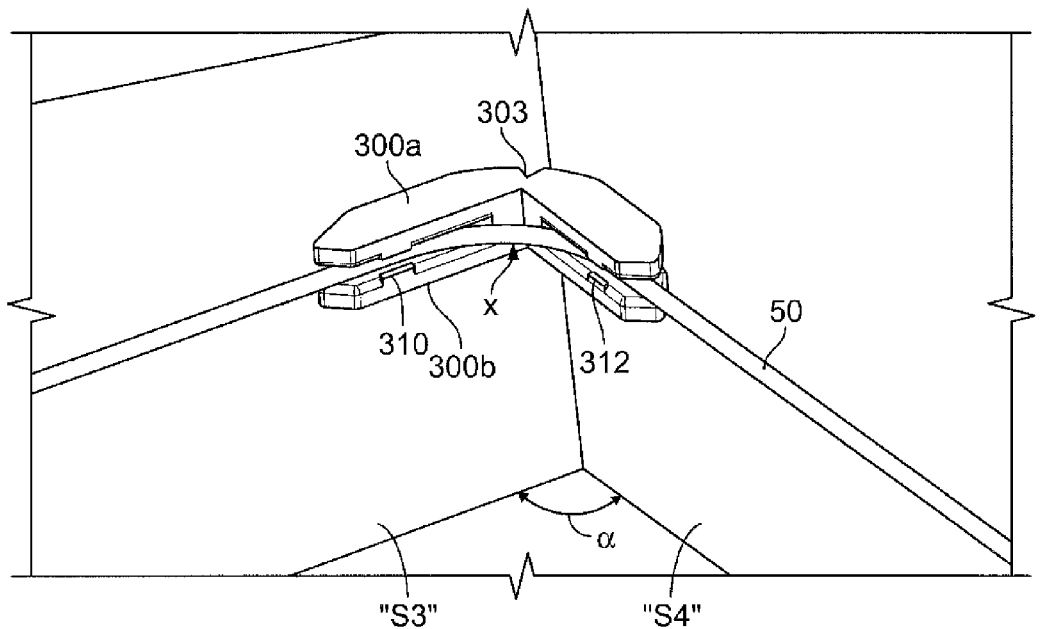
FIG. 7B is another perspective view of the installation apparatus of FIG. 4A shown in use relative to two other angled surfaces.

The installation apparatus 300 facilitates installation of the communications cable 50 across a corner defined by two surfaces. The first and second portions 30A, 30B may be arranged angled with respect to each other, defining angle α therebetween. Angle α corresponds to the angle defined between the surfaces defining the corner. As shown in FIG. 7A, inner surfaces 331, 333 are configured and adapted to be placed against surfaces S1, S2, respectively. As shown in FIG. 7B, outer surfaces 332, 334 are configured to be positioned against surfaces S3, S4, respectively.

Figure 7C:
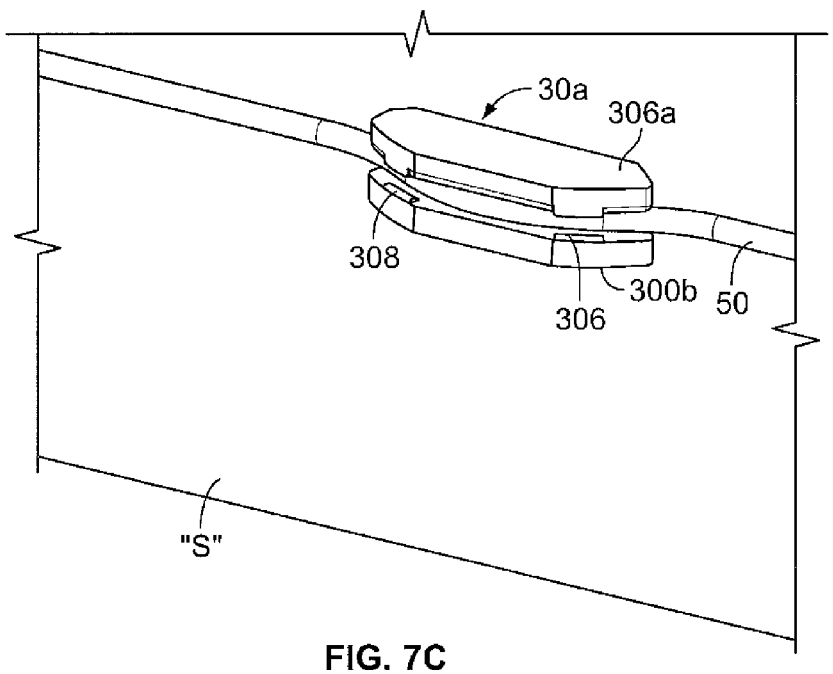
FIG. 7C is a perspective view of a first portion of the installation apparatus of FIG. 4A shown in use relative to a surface.

In an embodiment, as shown in FIG. 7C, the first and second portions 30A, 30B may be separated from each other. A groove 303 between the first portion 30A and 30B may facilitate bending of the first portion 30A towards or away from the second portion 30B, to provide for separation of the portions 30A and 30B from each other. Moreover, the groove 303 may provide a stress concentration to facilitate separation of the first portion 30A from the second portion 30B. The first and second portions 30A, 30B may be used to anchor a portion of the cable 50 to surface S. Anchoring the cable 50 (especially when a substantial length of cable installed) avoids sagging of cable 50, which might otherwise result in unacceptable bending of the cable 50.

Thus, as shown and described with respect to FIGS. 7A-7C, the apparatus 300 may be utilized to install or secure cable 50 to surfaces having different shapes and configurations depending on the particular application.

A further embodiment of an installation apparatus is shown in FIG. 8. As shown in FIG. 8, an installation apparatus 400 may include all of the features of apparatus 300 except where indicated otherwise and differs from apparatus 300 as described hereinbelow. The apparatus 400 includes a first portion 40A and a second portion 40B, as well as a first half 400A and a second half 400B. The first portion 40A, the second portion 40B, the first half 400A, and the second half 400B are substantially similar to the first portion 30A, the second portion 30B, the first half 300A, and the second half 300B, respectively, except for the following differences. In particular, the first portion 40A includes a slot 410 that extends through the first half 400A and the second half 400B, and the second portion 40B includes a slot 412 that extends through the first half 400A and the second half 400B. A tab 404 is located at a cable guide path 414, which is defined between the first and second halves 400A, 400B at the portion 40A and extends a length M. A tab 406 is located at a cable guide path 416, which is defined between the first and second halves 400A, 400B at the portion 40B and extends the length M. The slot 410 is positioned adjacent to the tab 404 on the side of the tab 404 that is closer to the groove 303. The slot 412 is positioned adjacent to the tab 406 on the side of the tab 306 that is closest to the groove 303. The slots 410 and 412 may provide that lengths of the halves 400A, 400B of the housing, which extend coextensive with the length M that the paths 414, 416 extend, may be adapted to permit that a relatively low force F may be applied to the cable 50 to insert the cable 50 into the paths 414 and 416, thereby easing installing of the cable 50 into the apparatus 400. As lengths of the halves 400A, 400B of the housing that are coextensive with, and thus form, the paths 414, 416, respectively, may be reduced by way of the slots 410 and 412, each of the portions of the halves 400A, 400B forming the paths 414, 416 is more flexible and, therefore, may be more readily bent when a cable is forced into the paths 414, 416, than if the slots 410 and 412 were omitted from the paths and the lengths of the portions of the halves 400A, 400B forming the paths 414, 416 were longer. Therefore, when a force F is applied to the cable 50 at locations corresponding to the portions of the cable 50 to be inserted into the paths 414, 416, an increased bending flexibility of the halves 400A, 400B at the paths 414, 416, which results from the reduced length M of the halves 400A, 400B defining the paths 414, 416, permits that a smaller force F may be applied to the cable 50 during insertion of the cable 50 to secure the cable within the paths 414, 416. Further, the slots 410 and 412 provide that a force F applied to the cable 50 may be focused at the locations of the cable to be inserted into the apparatus 400, because the force F applied by the user's finger U may be concentrated upon a smaller length of the cable 50 than would be the case without the slots 410 and 412.

An installation apparatus 500 is described with reference to FIGS. 9A and 9B. The apparatus 500 is configured to secure a cable within a groove between surfaces. For example, the apparatus 500 may be fit or placed within a groove 515 of a molding 510. The molding 510 may be positioned between adjacent surfaces of a room such as ceiling C and wall W (FIG. 9A). The molding 510 includes adjacent surfaces 531, 533 that are not coplanar or are angled with respect to each other. The groove 515 is generally defined by the intersection of the surfaces 531, 533.

The apparatus 500 may be generally wedge-shaped or triangular prism shaped to facilitate placement of the apparatus 500 between the surfaces 531, 533. The apparatus 500 includes a first surface 501 and a second surface 503 that are spaced along a height of the apparatus 500 in a direction along axis G (FIG. 9B). The apparatus 500 tapers, i.e., narrows, from the first surface 501 to the second surface 503 such that its width in a direction transverse to the axis G decreases, along the axis G, from the first surface 501 to the second surface 503. The first surface 501 has a first width K1 and the second surface 503 has a second width K2, the first width K1 being greater than the second width K2. The apparatus 500 may include sides 405, 507 that define contours corresponding respectively to the surfaces 531, 533 that define the groove 515 in which the apparatus 500 is to be placed. The apparatus 500 may be formed from a transparent or clear material or from a material matching the characteristics of the molding 510.

During use of the apparatus 500, a length of the cable 50 may be placed within the groove 515. Once a length of the cable 50 is placed within the groove 515, one or more apparatuses 500 are inserted within the groove 515 over the cable 50 such that each apparatus 500 may secure the cable 50 within the groove 515. The number of apparatuses 500 may correspond to the length of the cable 50. Adhesive 520 may be placed between the sides 405, 507 of the apparatus 500 and the surfaces 531, 533 defining the groove 515 to attach the apparatus 500 to the surfaces 531, 533, so as to avoid separation of the apparatus 500 from the groove 515. In one embodiment, the adhesive 520 may be the adhesive 100, as described above. The adhesive 520 may be double-sided tape, i.e., tape having adhesive on opposing sides, to facilitate securing of the apparatus 500 to the surfaces 531, 533. The adhesive 520 may be transparent or clear. Once the apparatus 500 is attached by adhesive to the surfaces defining the groove, installation is complete, such that the cable 50 is positioned within the groove 515 and the apparatus 500 is attached to the surfaces 531, 533 over the cable 50, thereby securing the cable 50 within the groove 515.

An installation apparatus 600 is described with reference to FIGS. 10A-10E. The apparatus 600 includes a backing 610 and an arm member 620 that is operatively coupled to the backing 610. The backing 610 and the arm member 620 may be integrally formed, and may extend from a lower portion 616 of the backing 610. The apparatus 600 may include an adhesive 615 or other suitable securing means to secure the backing 610 to a surface W. The arm member 620 may have a generally S-shaped configuration in which a lower portion 625 of the arm member bows outwardly, away from the backing 610, between a lower end 616 and an upper end 617 of the backing 610. The arm member 620 may be bendable or pivotable relative to the backing 610. In an embodiment, the arm member 620 is capable of being deflected relative to the backing 610 upon the application of a force, and is biased toward an initial position along direction P toward the backing 610. An upper portion 624 of the arm member 620 may include an end 623 that may be grasped by a user to facilitate bending of the arm member 620 relative to the backing 610. An upper portion 624 of the arm member 620 may include a fin 621 to facilitate maintaining a position of cable 50 placed on one side of the fin 621.

The apparatus 600 facilitates the installation of cable 50 in several positions along or relative to a surface W.

Figure 10A:
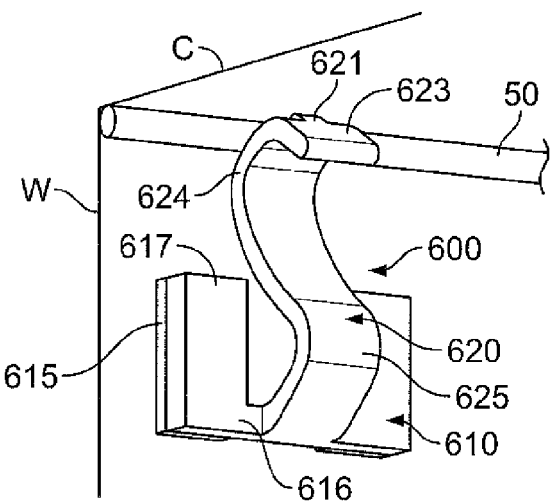
FIG. 10A is a perspective view of yet another embodiment of an installation apparatus shown relative to a communications cable in a first position.
Figure 10B:
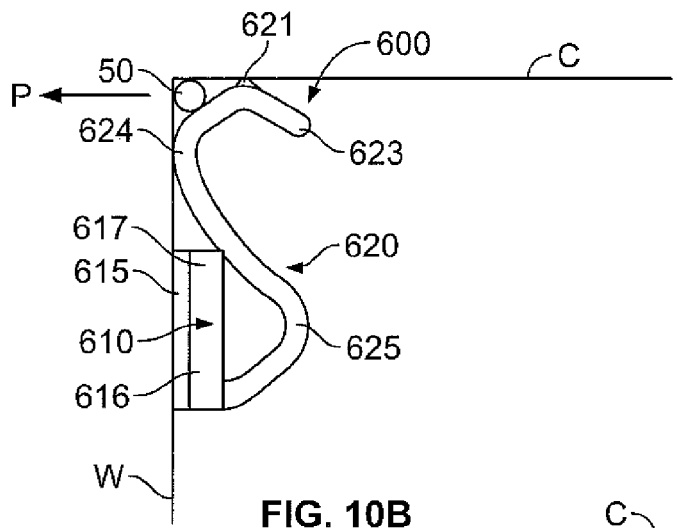
FIG. 10B is a side view of the installation apparatus as shown in FIG. 10A.

As shown in FIGS. 10A-10B, cable 50 may be secured in position at the intersection between surface W and surface C, which extends transversely from surface W, by upper portion 624 of the arm member 620. The bias of arm member 620 in direction P facilitates securing of the cable 50 between the surfaces W, C and the upper portion 624 of arm member 620. Fin 621 may also function as a barrier to secure the cable 50 in the desired position.

Figure 10C:
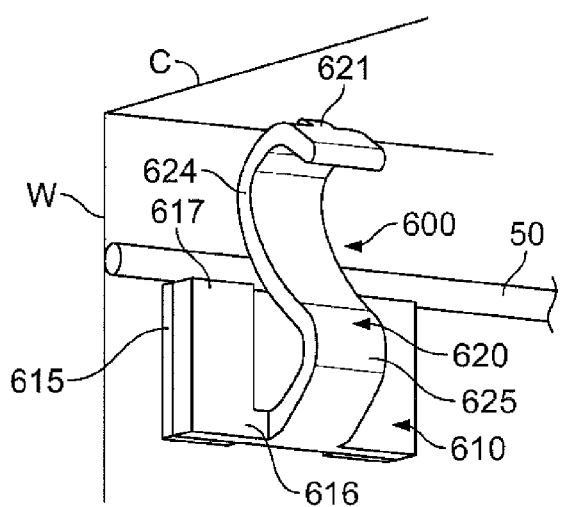
FIG. 10C is a perspective view of the installation apparatus of FIG. 10A shown relative to a communications cable in a second position.
Figure 10D:
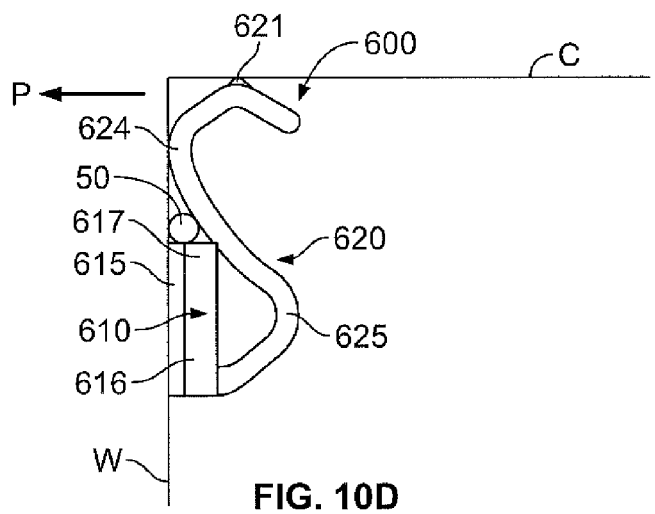
FIG. 10D is a side view of the installation apparatus as shown in FIG. 10C.

As shown in FIGS. 10C-10D, cable 50 is positioned between the upper portion 624 of the arm member 620 and the surface W. In particular, backing 610 may contribute to securing of the cable, by supporting the cable 50 thereon, and the bias of the upper portion 624 of the arm member 610 in direction P may facilitate securing the cable 50 against the surface W.

Figure 10E:
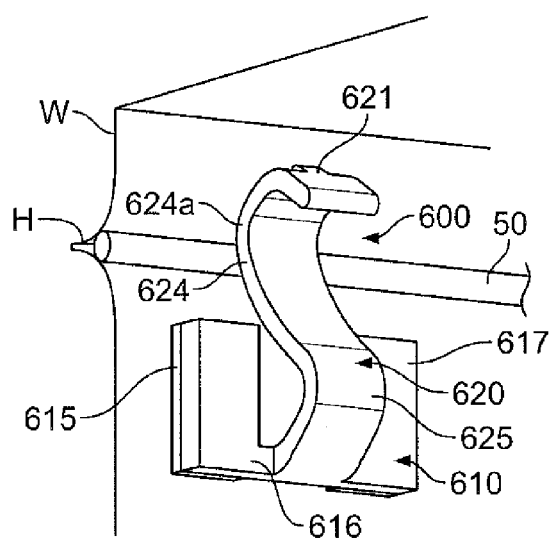
FIG. 10E is a perspective view of the installation of FIG. 10A shown relative to a communications cable in a third position.
Figure 10F:
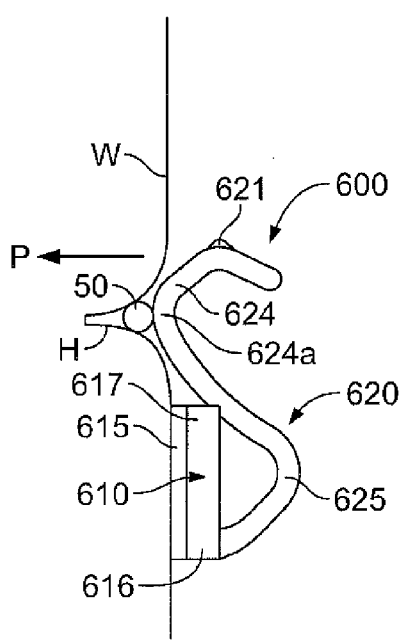
FIG. 10F is a side view of the installation apparatus as shown in FIG. 10E.

As shown in FIGS. 10E-10F, the apparatus 600 may facilitate installation of cable 50 within a groove H formed within surface W. In particular, inflection region 624a of a bowed portion of the S-curve configuration of the arm member 620, which forms the upper portion 624 of the arm member 620, may be positioned at the opening to the groove H, and the cable 50 may be positioned within the groove H. Thus, the arm member 620 facilitates securing of the cable 50 within the groove H.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended claims.

The invention claimed is:

1. An apparatus for facilitating installation of a communications cable, the apparatus comprising:
    a housing including first and second portions arranged at an angle with respect to each other, a plurality of guide structures and a plurality of tabs, wherein the housing defines first and second pathways extending from the first portion to the second portion,
    in which the first pathway is defined by at least one first tab of the tabs extending along a first side of the housing and the second pathway is defined by at least one second tab of the tabs extending along a second side of the housing opposite the first side of the housing,
    wherein at least one first guide structure of the guide structures is disposed spaced from the first and second sides of the housing, and wherein the first and second pathways extend respectively between the at least one guide structure and the first and second sides of the housing,
    wherein the first and second pathways are configured to releasably secure the cable therein, the first and the second pathways each defining a curve, wherein the curve defines a radius of curvature within a predetermined range of values for the cable at which transmission loss of a signal conveyed through the cable is minimized,
    wherein the housing defines a groove between the first and second portions at which the housing is configured for detachment of the first and second portions from each other,
    wherein the groove is at the first side of the housing and the angle is defined at the second side of the housing.
2. The apparatus of claim 1, wherein the angle is adjustable.
3. The apparatus of claim 1, wherein the first and second portions sections are separable so as to be detached from each other.

* * * * *